United States Patent
Carmona et al.

(10) Patent No.: US 10,330,454 B2
(45) Date of Patent: Jun. 25, 2019

(54) METHOD FOR DEFINING THE CURVE OF A TUBULAR STRUCTURE

(71) Applicant: Technip France, Courbevoie (FR)

(72) Inventors: Mickaël Carmona, Tencin (FR); Laurent Jouanet, Autrans (FR); Nathalie Sprynski, Saint Pierre d'allevard (FR); Olivier Delcroix, Rouen (FR); Patrick Lestanc, Saint Germain Village (FR)

(73) Assignee: TECHNIP FRANCE, Courbevoie (FR)

( * ) Notice: Subject to any disclaimer, the term of this patent is extended or adjusted under 35 U.S.C. 154(b) by 763 days.

(21) Appl. No.: 14/654,055

(22) PCT Filed: Dec. 18, 2013

(86) PCT No.: PCT/EP2013/077264
§ 371 (c)(1),
(2) Date: Jun. 19, 2015

(87) PCT Pub. No.: WO2014/096114
PCT Pub. Date: Jun. 26, 2014

(65) Prior Publication Data
US 2015/0345929 A1 Dec. 3, 2015

(30) Foreign Application Priority Data
Dec. 19, 2012 (FR) .................. 12 62320

(51) Int. Cl.
*G01B 5/24* (2006.01)
*G01B 5/004* (2006.01)
(Continued)

(52) U.S. Cl.
CPC .............. *G01B 5/24* (2013.01); *G01B 5/004* (2013.01); *G01B 7/28* (2013.01); *G01P 15/00* (2013.01); *G01V 7/00* (2013.01)

(58) Field of Classification Search
CPC . G01B 7/28; G01B 5/24; G01B 5/004; G01V 7/00; G01P 15/00; E04G 21/22;
(Continued)

(56) References Cited

U.S. PATENT DOCUMENTS

2003/0209365 A1* 11/2003 Downton ............... E21B 47/00
175/50
2008/0211808 A1   9/2008 David et al.
2012/0010817 A1*  1/2012 Mann ..................... G01V 7/16
702/6

FOREIGN PATENT DOCUMENTS

FR           2610100       7/1988
GB           2086055       5/1982
WO      WO2009/109745     9/2009

OTHER PUBLICATIONS

Willard Miller, The Formula for Curvature, Oct. 26, 2007, pp. 1-3.*
(Continued)

*Primary Examiner* — Sujoy K Kundu
*Assistant Examiner* — L. Anderson
(74) *Attorney, Agent, or Firm* — Occhiuti & Rohlicek LLP

(57) ABSTRACT

A method for determining the bend of a tubular structure, including determining the inclination of first and second rigid objects fixed in distinct locations along the tubular structure. The method includes supplying accelerometers ($A_1, \ldots A_N$) rigidly linked by the object to measure an acceleration in at least one direction of measurement (vj), the respective directions of measurement of at least two of said accelerometers being non-collinear. The measurement, by the accelerometers, of the components of the Earth's gravitational field along said directions of measurement, the measurement providing, for each of said directions, a measurement value, denoted $m_j$ for a measurement direction of index i. The method includes solving a defined matrix (Continued)

equation to determine the inclination $\Phi$ of the object relative to the reference frame of reference.

13 Claims, 2 Drawing Sheets

(51) Int. Cl.
    *G01P 15/00*     (2006.01)
    *G01V 7/00*     (2006.01)
    *G01B 7/28*     (2006.01)

(58) Field of Classification Search
    CPC .. G01C 9/06; G01C 21/10; G01C 9/02; G06F 3/046; G06F 3/0346
    See application file for complete search history.

(56) References Cited

OTHER PUBLICATIONS

Word Mark Goods and Services, STMICROELECTRONICS, USPTO Trademark Electronic Search System (TESS).*

* cited by examiner

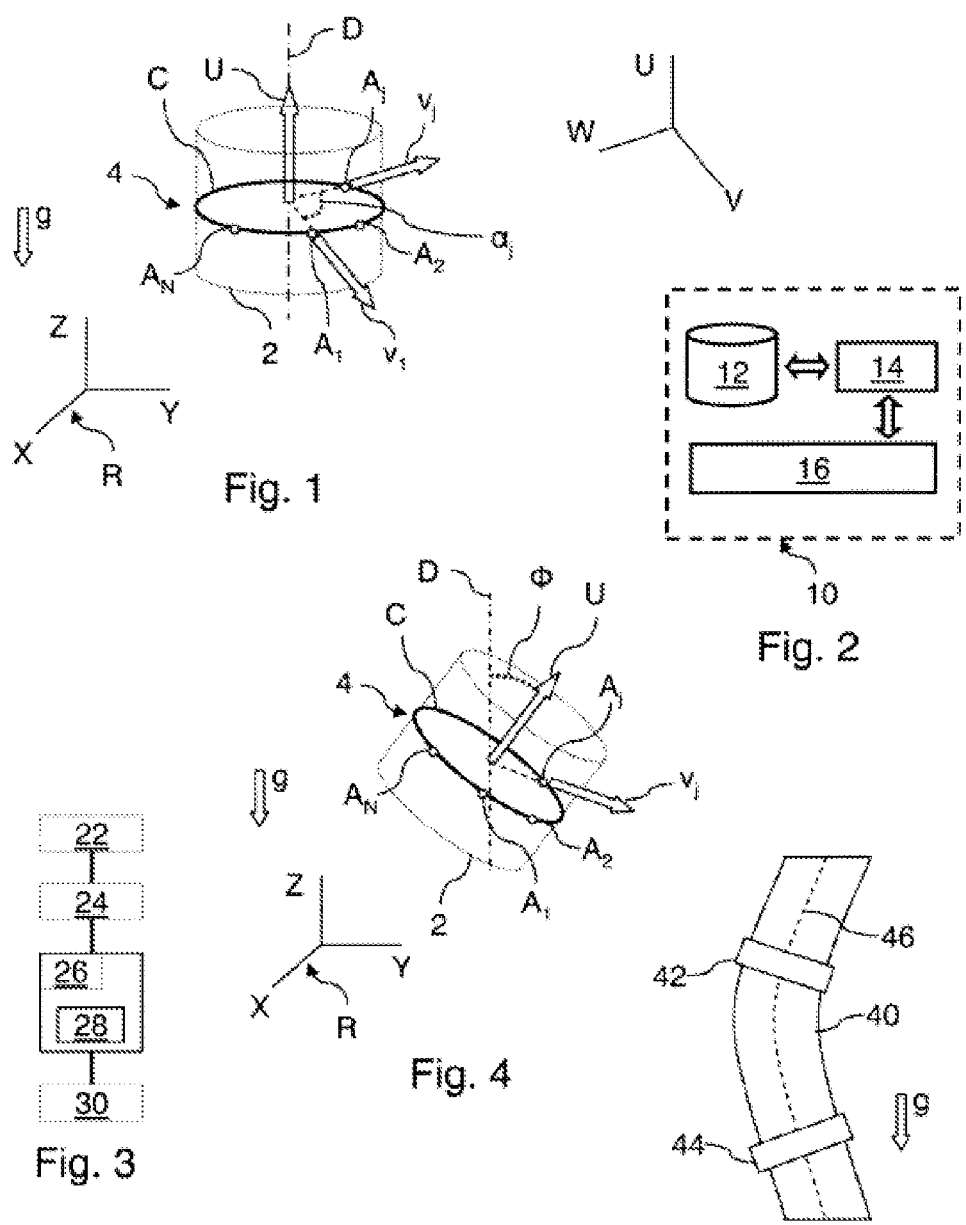

METHOD FOR DEFINING THE CURVE OF A TUBULAR STRUCTURE

RELATED APPLICATIONS

This application is a U.S. National Stage of International Application Number PCT/EP2013/077264, filed Dec. 18, 2013, which claims the benefit of the priority date of French Patent Application FR 1262320, filed Dec. 19, 2012, the contents of which are herein incorporated by reference.

FIELD OF INVENTION

The invention relates to a method for determining the bend of a tubular structure. The invention relates also to an instrumented tubular structure comprising a device for determining its bend.

BACKGROUND

The present invention relates notably to tubular structures, in particular the tubular structures intended to transport hydrocarbons used offshore. Such tubings are typically submarine pipes. The offshore operation of an oil or gas deposit located at great depth is generally done from a floating production system situated on the surface, for example from an FPSO (Floating Production Storage and Offloading) or from a floating oil platform. Now, these floating systems are not static and move under the effect of the currents, the swell, the waves and the wind. Consequently, the submarine pipes used to raise the hydrocarbons from the seabed to the surface have to be capable of being deformed to accommodate the movements of the floating system.

These pipes are therefore designed to withstand the bends and the repeated bend variations that they will have to undergo in service for a long time (20 years and more). In the absence of measurement, the bends are estimated by computation, which means assuming significant safety margins and therefore pointlessly over-dimensioning the pipes. This is why it is desirable to be able to measure the bend of a pipe in service, preferentially in the areas most subject to fatigue stress, which is the aim of the present invention.

In the case of a riser linking the seabed to a floating support, the most critical area is generally situated in the upper part, in proximity to the connection with the floating support. In effect, at this point, the pipe undergoes, on the one hand, a very strong tension linked to its suspended weight (commonly, several hundreds of tons), and, on the other hand, strong bend variations linked to the movements of the floating support. These combined static and dynamic loadings can generate a pipe fatigue phenomenon at this point. Depending on the configuration of the pipe, there may be other critical areas, notably in proximity to the point of contact between the pipe and the seabed (touch-down point). The critical areas are generally submarine and inaccessible because of a hostile environment, which complicates the bend measurement problem.

The document WO2009/109745 describes the use of an inclinometer fixed onto the pipe and a positioning system fixed onto the floating support. The document describes the determination of relative inclination of the pipe relative to the floating support. However, this document does not provide any detailed information on the inclination measurement, or on how to determine the bend from the measurements performed.

SUMMARY OF INVENTION

The present invention aims to propose a reliable and robust solution for measuring the bend of a tubular structure, that makes it possible to avoid having to access this tubular structure in a hostile environment.

The invention thus relates to a method for determining the bend of a tubular structure, comprising:
 the determination of the inclination of first and second rigid objects in a fixed reference frame of reference (X, Y, Z) relative to the direction of the Earth's gravitational field, said rigid objects being fixed in distinct locations along said tubular structure, the determination of the inclination of each of said objects comprising:
 the supply of a plurality of accelerometers rigidly linked by the object, each of these accelerometers being able to measure an acceleration in at least one direction of measurement, the respective directions of measurement of at least two of said accelerometers being non-collinear;
 the measurement, by said accelerometers, of the components of the Earth's gravitational field along said directions of measurement, this measurement providing, for each of said directions, a measurement value, denoted $m_j$ for a measurement direction of index i;
 the solving of the following matrix equation to determine the inclination $\phi$ of the object (54) relative to the reference frame of reference:

$$M = A \begin{bmatrix} \cos(\phi) \\ -\sin(\phi)\sin(\eta) \\ -\sin(\phi)\cos(\eta) \end{bmatrix}$$

with M being the vector of which the ith component is defined by the measurement $m_j$, A being a matrix defined by the directions of measurement of the accelerometers in a reference frame secured to the object, and $\eta$ being an angle of rotation of this secured reference frame relative to the fixed reference frame;
 the determination of the bend of the tubular structure from the inclinations determined for the first and second objects.

According to a variant, at least two accelerometers of each of said objects are remote.

According to another variant, the solving of the matrix equation when determining an inclination comprises the minimization of a criterion $L(\phi, \eta)$ defined by the following equation:

$$L(\phi, \eta) = \left\| M - A \begin{bmatrix} \cos(\phi) \\ -\sin(\phi)\sin(\eta) \\ -\sin(\phi)\cos(\eta) \end{bmatrix} \right\|^2$$

According to another variant, there are at least four of said accelerometers for each of said objects, they are distributed in a circle and each exhibit a direction of measurement defined by the radius linking this accelerometer to the center of the circle.

According to yet another variant, said accelerometers are distributed uniformly on said circle.

According to a variant, the accelerometers exhibit a gaussian and centered statistical measurement noise, said solving of the matrix equation comprising the minimization of a criterion $L(\phi,\eta)$ defined by the following equation:

$$L(\theta,\eta)=(\sin(\phi)\underline{f}(\eta)-\underline{m})^T \times \underline{\Gamma}^{-1} \times (\sin(\phi)\underline{f}(\eta)-\underline{m})$$

with $\underline{f}(\eta)$ being a vector of which the ith component is equal to $-\sin(\alpha_i+\eta)$, with $\underline{\Gamma}$ being a covariance matrix corresponding to the statistical measurement noises of the accelerometers for said directions of measurement.

According to another variant, the statistical noises of the accelerometers are statistically independent, and the covariance matrix $\underline{\Gamma}$ is a diagonal matrix defined positive of which the ith coefficient is equal to the variance $\sigma_i^2$ for the ith direction of measurement.

According to another variant, said tubular structure exhibits a maximum inherent acceleration relative to the reference frame of reference at least ten times less than the amplitude of the gravitational field g, preferably at least twenty times less than the amplitude of the gravitational field g during said measurements.

According to yet another variant, said inclinations used for the determination of said bend are based on simultaneous measurements of the accelerometers of the first and second objects.

According to a variant, the bend of the tubular structure between the first and second objects is determined by means of the following formula:

$$k(S) = \frac{d\phi(s)}{ds}$$

in which k(S) is the bend at the point S of curvilinear abscissa s between the first and second objects, $\Phi(s)$ being the inclination of the tubular structure at the point S of curvilinear abscissa s.

The invention also relates to a tubular deformable structure, comprising:
  first and second rigid objects;
  for each of said objects, a plurality of accelerometers rigidly linked by their respective object, each of these accelerometers being able to measure a component of the Earth's gravitational field in at least one direction of measurement to provide a measurement value denoted $m_j$ for a direction of measurement of index i, the respective directions of measurement of at least two of said accelerometers being non-collinear;
  a computation device programmed to:
    determine the inclination $\phi$ of each of said first and second objects relative to a fixed reference frame of reference relative to the direction of the Earth's gravitational field, by solving the following matrix equation:

$$M = A \begin{bmatrix} \cos(\phi) \\ -\sin(\phi)\sin(\eta) \\ -\sin(\phi)\cos(\eta) \end{bmatrix}$$

with M being the vector of which the ith component is defined by the measurement $m_j$, A being a matrix defined by the directions of measurement of the accelerometers in a reference frame secured to said object, and $\eta$ being an angle of rotation of this secured reference frame relative to the fixed reference frame;

determine the bend of the tubular structure between said first and second objects from the inclinations determined for the first and second objects.

Other features and advantages of the invention will emerge clearly from the description which is given thereof hereinbelow, by way of indication and in a nonlimiting manner, with reference to the attached drawings.

BRIEF DESCRIPTION OF THE DRAWINGS

FIG. 1 schematically illustrates an object comprising a device for measuring the inclination of this object, this object exhibiting a zero inclination relative to a vertical direction;

FIG. 2 schematically illustrates a device for computing the inclination of the object of FIG. 1;

FIG. 3 is a flow diagram of a method of using the device of FIG. 1;

FIG. 4 schematically illustrates the object of FIG. 1 in an inclined position relative to the vertical direction.

FIG. 5 schematically illustrates, by a profile view, a portion of a tubular structure comprising two objects according to FIG. 1;

DETAILED DESCRIPTION

Figure 6:
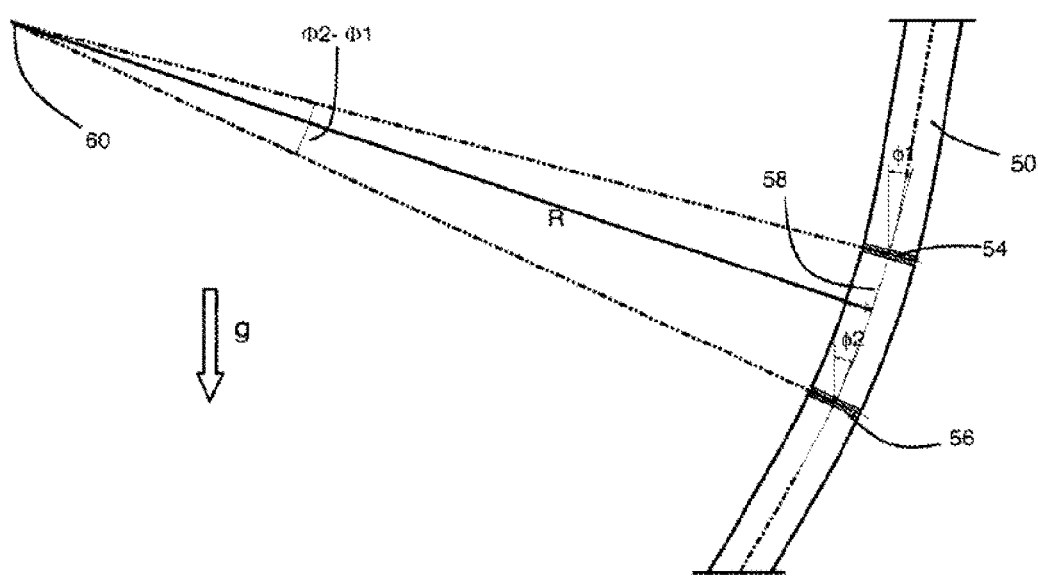
FIGS. 6 and 7 schematically illustrate, by profile views, a portion of instrumented tubular structure in two different positions, on the one hand a bent position and on the other hand a rectilinear position.

In the present application, the term "tubular structure" covers both the flexible pipes, the rigid pipes and the umbilicals used in the field of oil or gas exploration, and, on the other hand, the accessories of stiffener or bend limiter type that can be fixed around the pipes or umbilicals. These pipes can be of flexible or rigid type depending on the application.

The offshore oil pipes are generally used to transport the hydrocarbons extracted from a deposit, but they can also be used to transport pressurized seawater intended to be injected into a deposit in order to increase the quantity of hydrocarbons extracted therefrom. The internal diameter of these oil pipes is typically between 50 mm and 500 mm. They can be used at great depth (commonly at more than 1000 m) and are in this case designed to withstand a very high external pressure. The pressure of the hydrocarbons transported is commonly greater than 10 MPa and can sometimes reach 100 MPa. Furthermore, the temperature of the hydrocarbons transported is sometimes greater than 100° C., for example of the order of 120° C.

The flexible oil pipes generally have a complex structure. They comprise at least one watertight flexible tubular layer reinforced by at least one helically wound profile member. Generally, the watertight flexible tubular layer is a tube of polymer material, and the reinforcing profile members are wires made of steel or of composite material. Such flexible pipes are notably described in the normative document API RP 17B "Recommended Practice for Flexible Pipe" published by the American Petroleum Institute. They are generally used in the areas where great flexibility is required, notably in the very dynamic areas of risers.

The rigid pipes are generally produced by assembly by welding or screwing together rigid tubular elements made of very thick steel. They can also include other layers, notably layers of thermal insulation or corrosion-protection layers. The rigid pipes can also be made of composite material, for example from a thin watertight tube reinforced by a cladding of composite material. The rigid pipes are normally reserved for static applications, but they can also be used for certain weakly dynamic applications, notably in combination with floating supports exhibiting great stability.

Cryogenic flexible pipes are used to transport liquefied natural gas (LNG), typically from a liquefaction unit to a transport ship or from a transport ship to a storage unit. The watertight flexible tubular layer of these flexible pipes is generally a thin corrugated metal tube.

The umbilicals are tubular structures comprising a plurality of components including at least one tube, the other components being able to be tubes, electric cables, or fiber optic cables. The components are joined together by helical winding which confers a high degree of flexibility on the assembly. The umbilicals are generally used to control submarine installations of wellhead, valve or pump type from the surface. They can also have other functions and in particular be used to inject into the oil pipes fluids facilitating the flow of the oil or even corrosion inhibitors. The umbilicals are notably described in the normative document API RP 17E "Specification for Subsea Umbilicals" published by the American Petroleum Institute.

The method for determining the bend of a tubular structure according to the present invention is based on inclination measurements that can be performed solely using accelerometers. The accelerometers are robust and cost-effective sensors, which constitutes a first advantage of the invention. Furthermore, the method does not assume any prior knowledge as to the absolute angular position of the accelerometers relative to a reference frame of reference, which makes it possible to avoid having to conduct such a calibration of the measurements once the tubular structure is installed on site. In effect, the tubular structures targeted by the present invention are generally very difficult to access once installed at sea. Consequently, a calibration of the inclination measurements based on a comparison with other reference measurements performed on site after installation would be complex and prohibitive to implement. The elimination of such a calibration therefore constitutes a second advantage of the invention. Furthermore, the inclination measurements performed according to the invention prove accurate even for small inclination values, which makes it possible to determine a bend and a fatigue of a tubing with great accuracy, which constitutes a third advantage of the invention.

A method for computing inclination, implemented to perform a computation of bend according to the invention, will first be described.

FIG. 1 represents an instrumented object 2, comprising a device 4 configured to determine the inclination of the object 2 relative to a reference direction D. The reference direction D is the direction in which the gravity to which the object 2 is subject is applied. For example, the object 2 is subject to the Earth's gravity; the reference direction D is the direction of the Earth's gravitational field, represented by the vector g and defining a vertical direction.

The object 2 is, in the example, a solid considered to be non-deformable, that is to say that the distance separating any points of the object 2 does not vary when this object 2 undergoes a movement. This object 2 is, here, of cylindrical form. An orthonormal reference frame, defined by the vectors U, V, W and secured to the object 2, is defined here, U being the vector of the direction of the axis of the cylinder (in a general case, an orthonormal reference frame can be associated arbitrarily with an object that is not necessarily cylindrical). To simplify, this object 2 is drawn in dotted lines in FIG. 1 (and in FIG. 4). The object 2 can for example be produced in the form of a non-deformable collar intended to be fixed onto a deformable tubular structure.

In this description, to characterize the inclination of the object 2, an orthonormal reference frame R is defined, called "frame of reference". This reference frame R is made up of three orthonormal directions X, Y and Z. The vertical direction, denoted Z, is parallel to the direction D of the gravitational field g in the example. The gravitational field g will be expressed by the vector [0; 0; 1] in the reference frame R. The inclination of the object 2 is here defined as being the angle formed between the direction D and the axis U along which the object 2 extends. In FIG. 1, the object 2 is illustrated with a zero inclination, the directions D and U are therefore parallel.

A general case of implementation of the invention will be studied first of all.

The unitary vectors of the orthonormal reference frame secured to the object 2 can be defined as follows in the reference frame R:

$$U = \begin{bmatrix} \sin(\phi)\cos(\theta) \\ \sin(\phi)\sin(\theta) \\ \cos(\phi) \end{bmatrix}$$

$$V = \begin{bmatrix} \cos(\eta)\sin(\theta) + \sin(\eta)\cos(\phi)\cos(\theta) \\ -\cos(\eta)\cos(\theta) + \sin(\eta)\cos(\phi)\sin(\theta) \\ -\sin(\phi)\sin(\eta) \end{bmatrix}$$

$$W = U \wedge V$$

with φ being the inclination of the object 2 relative to the direction D, θ being the azimuth of U, and q being an angle of rotation of the reference frame secured to the object 2 relative to the reference frame R, ˆ being the vector product operator.

The device 4 is therefore configured to determine the inclination φ of the object 2 relative to the direction D. η is an intermediate parameter, used in formalizing the problem. This device 4 comprises at least two accelerometers. This device does not however use a magnetometer or a gyrometer to determine this inclination. Each of these accelerometers is configured to measure an acceleration in at least one direction of measurement. These accelerometers are:
  linked together by a rigid link;
  able to measure the Earth's gravitational field and not only the relative acceleration of the object 2;
  placed in such a way that at least two accelerometers exhibit respective directions of measurement which are not mutually collinear. Advantageously, the angle between these directions is at least equal to 30°, preferably at least equal to 45°, and even more preferentially at least 60°. The coordinates of the directions of measurement or of sensitivity of the accelerometers are known in the reference frame U, V, W. The accelerometers are advantageously remote to reduce the uncertainties of the estimation of the measurements.

In this example, the device 4 comprises N accelerometers $A_1$ to $A_N$, where N is an integer number advantageously greater than or equal to three, four or seven or ten. Here, these accelerometers are mono-axial, that is to say that each accelerometer has only one direction of measurement. These accelerometers $A_1$ to $A_N$ have here an embedded link with the object 2. The object 2 here forms a rigid link with the accelerometers $A_1$ to $A_N$.

The invention can of course also be implemented by including among the accelerometers one or more accelerometers with 2 or 3 directions of measurement. Such accelerometers will be treated as a plurality of mono-axial accelerometers among the accelerometers $A_1$ to $A_N$, each having one direction of measurement. In this description, the ith accelerometer is designated by the reference $A_i$ in which i is an integer number greater than or equal to 1 and less than or equal to N. The direction of measurement of this ith mono-axial accelerometer is denoted $v_i$. In the general case, this ith accelerometer will be referred to, to designate general properties of said accelerometers.

To simplify, the position of each of these accelerometers is embodied by a spot position. To simplify, in FIGS. 1 and 4, only the accelerometers $A_1$, $A_2$, $A_j$ and $A_N$ are illustrated.

The acceleration measured by each of these accelerometers corresponds to the geometrical projection of the gravitational field g onto the direction of measurement of this accelerometer.

The direction of measurement $v_i$ of any one of the accelerometers $A_i$ is determined by the following equation, with coefficients $a_{i,1}$, $a_{i,2}$, $a_{i,3}$ being coefficients known by assumption, invariant over time because of the rigid link between the accelerometers $A_1$ to $A_N$.

$$v_i = a_{i,1}U + a_{i,2}V + a_{i,3}W$$

Each accelerometer thus performs a following measurement $m_i$, corresponding to the projection of the gravitational field onto its direction of measurement:

$$m_i = a_{i,1}(U^T g) + a_{i,2}(V^T g) + a_{i,3}(W^T g)$$

Thus, $m_i = v_i^T g$, in which T designates the matrix transposition.

The vector $[m_1, \ldots m_N]^T$ containing the different measurements of the accelerometers is defined by M.

A matrix A is introduced, defined by:

$$A = \begin{bmatrix} a_{1,1} & a_{1,2} & a_{1,3} \\ a_{2,1} & a_{2,2} & a_{2,3} \\ \ldots & \ldots & \ldots \\ a_{N,1} & a_{N,2} & a_{N,3} \end{bmatrix}$$

By noting that $U^T g = \cos(\phi)$, $V^T g = -\sin(\phi)\sin(\eta)$ and $W^T g = -\sin(\phi)\cos(\eta)$, it is possible to concatenate the preceding equations in the following form:

$$M = A \begin{bmatrix} \cos(\phi) \\ -\sin(\phi)\sin(\eta) \\ -\sin(\phi)\cos(\eta) \end{bmatrix}$$

It is therefore possible to retrieve the angles $\phi$ and $\eta$ when the matrix A (of which the coefficients are known) is at least of rank 2, that is to say when at least two directions of measurement are non-collinear.

This matrix equation can be solved by minimizing the following criterion:

$$L(\phi, \eta) = \left\| M - A \begin{bmatrix} \cos(\phi) \\ -\sin(\phi)\sin(\eta) \\ -\sin(\phi)\cos(\eta) \end{bmatrix} \right\|^2$$

$\|.\|$ defining the euclidian norm of three-dimensional vectors. This solution remains valid even when the matrix equation of M is disturbed by uncertainties of amplitudes at least 10 times less than the amplitude of the gravitational field g.

The minimization of this criterion L makes it possible to maximize the likelihood function of the system. The solution provides values $\phi_0$ and $\eta_0$ minimizing the criterion L. Minimization algorithms are known to those skilled in the art.

Such a method for determining inclination thus makes it possible to obtain a good accuracy from the use of two directions of measurement, and without any magnetometer. Such an inclination is obtained relative to the axis U, in any plane including this axis U. Furthermore, such a method makes it possible, in practice, to obtain a good accuracy of determination of the inclination, from low inclination values, which proves advantageous for applications where the inclination varies within a relatively limited range. By comparison, a gyroscope does not provide any reliable measurement for a low inclination value and is sensitive to the noise and the environment. Given the stresses applied to a submarine pipe, the accurate knowledge of the inclination of a section of this pipe from the smallest deviations relative to the vertical is predominant in reliably computing the bend thereof and the remaining life with respect to the fatigue criterion.

There now follows a description of a specific implementation of the determination of the inclination illustrated with reference to FIG. 1, and that proves particularly advantageous.

Here, the accelerometers are positioned on a circle C, passing through each of the accelerometers and such that the directions of measurement of the accelerometers are contained in the plane including this circle. Also, the normal to the plane including the circle C coincides with the direction defined by the vector U. For example, these accelerometers are accelerometers marketed by the company "Colibrys" under the marketing reference "MS9002".

The direction of measurement of the accelerometer A1 is chosen to be collinear to the axis V for this example. Here, the direction of measurement $v_i$ of the ith accelerometer extends radially from the center of the circle C. This direction $v_i$ is here represented by a vector, the direction of which is a straight line passing through the spot position of the ith accelerometer and through the center of the circle C.

The direction of measurement $v_i$ is written:

$$v_i = \cos(\alpha_i)V + \sin(\alpha_i)W$$

with $\alpha_i$ being the known positioning angle of the accelerometer $A_i$ relative to a reference accelerometer ($A_1$ in this example) about the axis U.

In this example, the matrix A is then expressed:

$$A = \begin{bmatrix} 0 & \cos(\alpha_1) & \sin(\alpha_1) \\ 0 & \cos(\alpha_2) & \sin(\alpha_2) \\ \ldots & \ldots & \ldots \\ 0 & \cos(\alpha_N) & \sin(\alpha_N) \end{bmatrix}$$

The measurement vector M is then expressed with the following theoretical expression:

$$M = -\sin(\phi) \begin{bmatrix} \sin(\alpha_1 + \eta) \\ \sin(\alpha_2 + \eta) \\ \ldots \\ \sin(\alpha_N + \eta) \end{bmatrix}$$

This matrix equation can be solved by minimizing the following criterion:

$$L(\phi, \eta) = \left\| M + \sin(\phi) \begin{bmatrix} \sin(\alpha_1 + \eta) \\ \sin(\alpha_2 + \eta) \\ \ldots \\ \sin(\alpha_N + \eta) \end{bmatrix} \right\|^2$$

Here, the measurement signal $m_i$ is affected by a statistical noise for each of the accelerometers. The measurement signal is therefore broken down into two terms and is of the following form: $M=\sin(\phi) \cdot f(\eta)+b$, with b being a vector representative of the measurement error because of the respective statistical noises $b_i$ of the sensors $A_i$, $\underline{f}(n)$ being a vector of which the ith component is equal to $-\sin(\alpha_i+\eta)$.

In this example, each statistical noise is a gaussian and centered statistical process, which corresponds to a good approximation of the reality for a great number of accelerometers. The variance of this statistical noise, for the ith accelerometer, is denoted $\sigma_i^2$. The covariance matrix $\underline{\Gamma}$ associated with this statistical process is defined.

The respective statistical noises of the N accelerometers are here statistically independent. Thus, in this example, this matrix $\underline{\Gamma}$ is a diagonal and defined positive matrix, of which the ith diagonal coefficient is equal to the variance $\sigma_i^2$ of the ith accelerometer.

The matrix equation can then be solved by minimizing the following criterion:

$$L(\phi,\eta)=(\sin(\phi)\underline{f}(\eta)-\underline{m})^T \times \underline{\Gamma}^{-1}(\sin(\phi)\underline{f}(\eta)-\underline{m})$$

Advantageously, to reduce the total error on the inclination of the object 2 originating from the statistical noise of the individual accelerometers, these accelerometers are placed on the circle C as follows:

if the respective variances of the accelerometers satisfy the following condition (called condition of optimality):

$$\sigma_{max}^{-2} \leq \frac{1}{2} Tr(\underline{\Gamma}^{-1})$$

in which $\sigma_{max}^{-2}$ is the maximum inverse of the inverses $\sigma_j^{-2}$ of the variances of the accelerometers, Tr designates the trace mathematical operator and $\underline{\Gamma}$ is the covariance matrix, then the accelerometers are placed on the circle C so as to satisfy the following relationships:

$$\sum_{j=1}^{N} \sigma_j^{-2} \sin(2\alpha_j) = 0$$

and $$\sum_{j=1}^{N} \sigma_j^{-2} \cos(2\alpha_j) = 0$$

if the respective variances of the accelerometers do not satisfy the condition of optimality, then the accelerometer exhibiting the maximum inverse variance $\sigma_{max}^{-2}$ is placed in any position on the circle C and all the other accelerometers are placed, on the circle C, at an angle of 90° from this accelerometer.

The device 4 further comprises a computation device 10, configured to automatically compute the inclination of the object 2. FIG. 2 schematically represents this device 10. This device 10 comprises:

an information storage medium 12,
a programmable electronic computer 14,
a data exchange interface 16.

The computer 14 is notably programmed to execute information contained on the medium 12. The medium 12 contains instructions for the execution of the method of FIG. 3. The interface 16 notably allows for the acquisition, by the computer 14, of the measurement values m(j) supplied by the accelerometers of the device 4. For example, the interface 16 comprises a databus, such as a serial bus (serial peripheral interface), electrically linked to the accelerometers $A_1$ to $A_N$.

Numerous other embodiments are possible.

The object 2 can take a different form. The inclination of the object 2 can be defined other than relative to the axis U.

The accelerometers are not necessarily all mono-axial. For example, the accelerometers are tri-axial accelerometers, like those marketed by the company "STMicroelectronics" under the marketing reference "LSM303DLH".

The accelerometers of the device 4 can be placed differently relative to the object 2. Notably, these accelerometers can have a spatial configuration other than the circle C.

An accelerometer may not exhibit any statistical noise. In this case, for each direction of measurement $v_j$ associated with this accelerometer, the noise b(j) is zero and the coefficients $\sigma_j^2$ which appear in the estimator L are set at 1.

At least two objects 2 are combined to determine the bend of a deformable tubular structure.

FIG. 5 to this end represents a portion of a deformable tubular structure 40 on which instrumented objects 42 and 44, for example identical to the object 2, are placed. Properties of deformation of the structure 40 can thus be indirectly computed from the inclination of each of the objects 42 and 44. It can be considered that the objects 42 and 44 are non-deformable relative to the tubular structure 40 if the deformations induced on these objects are negligible compared to the relative displacements between these objects, displacements due to the deformations of the tubular structure 40.

In this example, the tubular structure 40 can be deformed by bending. The objects 42 and 44 are here kept secured to the structure 40 by an embedded link. The objects 42 and 44 are, for example, rigid metallic collars clamped around the tubular structure 40. These objects 42 and 44 are for example connected, by a databus, to a computation unit configured to determine the bend of a median direction 46 of the structure 40, from the inclinations measured simultaneously by each of the objects 42 and 44. To simplify, this databus and this computation unit are not illustrated in FIG. 5. The inclination of these objects 42 and 44 is here defined relative to the direction of the gravitational field g, here vertical.

This computation unit is notably programmed to:
evaluate the inclination at any point of the structure 40, from the simultaneous measurements supplied by the objects 42 and 44, for example, by means of interpolation methods such as cubic spline interpolation;

compute, from the knowledge of this inclination at any point of the structure 40, the bend k at any point of the direction 46 of the structure 40, for example by means of the following formula (assuming that the median direction of the structure is not left):

$$k(S) = \frac{d\phi(s)}{ds}$$

in which k(S) is the bend of the direction 46 at the point S of curvilinear abscissa s (the origin of the curvilinear abscissae being set arbitrarily, Φ(s) being the inclination of the structure 40 at the point S of curvilinear abscissa s.

These examples of interpolation and reconstruction methods are for example described in chapter 1 of the doctoral thesis by N. Sprynski, "Reconstruction of curves and surfaces from tangential data", Université Joseph Fourier, Grenoble, France, 2007.

When a number of objects 42, 44 are used jointly on a same structure 20 to determine properties of this structure 40, then the computation device 10 can take a different form. For example, this device 10 is not necessarily incorporated in each of the objects 42, 44. A single object 10 can then be placed outside of these objects 42, 44, in a data processing unit configured to receive the measurement data from the accelerometers of the objects 42 and 44.

Figure 7:
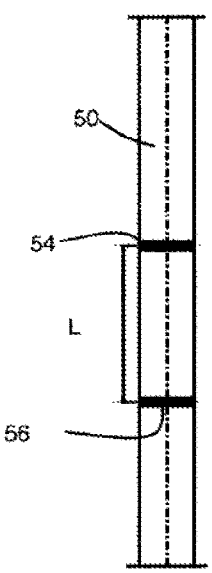

FIGS. 6 and 7 represent a same portion of tubular structure 50 in two different positions. In FIG. 6, the tubular structure 50 is bent and locally exhibits a bending radius equal to R. In FIG. 7, the tubular structure 50 is straight (infinite bending radius). On this structure 50, instrumented non-deformable collars 54 and 56 are arranged, for example identical to the object 2.

The instrumented non-deformable collars 54, 56 are clamped around the tubular structure 50 so that they cannot slide along the latter when the latter is bowed. The distance L separating the centers of the two collars 54, 56, a distance measured along the axis of the tubular structure 50, is therefore constant and independent of the bend of the tubular structure 50.

The inclinations φ1 and φ2 of the non-deformable collars 54, 56 are first determined according to the method defined previously. Then, the local bend k of the tubular structure 50 can be computed from the inclination of each of the collars 54 and 56 by using, for example, the following approximate formula (with R being the radius of the non-deformable collars 54 and 56):

$$k = \frac{1}{R} = \frac{d\phi}{ds} = \frac{\phi 2 - \phi 1}{L}$$

in which the inclinations φ1 and φ2 are expressed in radians, R and L are expressed in meters, and the bend k is expressed in $m^{-1}$.

It emerges from this formula that the bend estimation error becomes smaller as the collars 54 and 56 are brought closer together. Thus, advantageously, the distance L separating the two collars 54, 56 is less than 1 meter, and preferentially less than 50 centimeters.

An example of determination of the bend of a tubular structure 50 will now be described in detail, with reference to the flow diagram of FIG. 3.

The information for the respective matrices A of the accelerometers of the two collars 54 and 56 are defined previously, possibly with the statistical noise properties of these accelerometers.

At an instant t, the tubular structure 50 is in an initial position with a given configuration. Then, in a step 22, the tubular structure undergoes a deformation to a new configuration. During this deformation, each collar 54 and 56 undergoes a displacement from its initial position to a position in which it exhibits a new inclination relative to the reference direction D. For example, the collars 54 and 56 undergo respective rotations relative to the reference frame R. Here, on completion of these rotations, the collars 54 and 56 exhibit non-zero respective angles of inclination denoted φ1 and φ2, relative to the direction D (FIG. 4).

In a step 24, the accelerations undergone by the accelerometers of the collars 54 and 56 are measured. Each accelerometer provides an acceleration measurement $m_i$.

During the measurement, the tubular structure 50 is in a quasi-static state, since the determination of the inclinations uses a solution based on the measurements of the gravitational field g by the different accelerometers. It can be considered that the tubular structure 50 is in a quasi-static state when the maximum inherent acceleration (that is to say corresponding to the movement of the structure) of the tubular structure 50 relative to the reference frame R is at least ten times or twenty times or fifty times less than the amplitude of the gravity g. Thus, the measurement is suited to a tubular structure 50 whose normal conditions of use are of quasi-static type.

During a step 26, the respective inclinations of the collars 54 and 56 are determined automatically from the measurements $m_i$. During this step, an operation 28 includes the solving of the equation of the type $$M = A \begin{bmatrix} \cos(\phi) \\ -\sin(\phi)\sin(\eta) \\ -\sin(\phi)\cos(\eta) \end{bmatrix}$$

for each collar 54 and 56.

In a step 30, the inclinations determined in the step 26 are used to compute the local bend (between the collars 54 and 56) of the tubular structure 50.

Steps of the method of FIG. 3 can be executed in a different order and/or can be simultaneous.

In the step 20, the tubular structure 50 is not necessarily placed in an initial state exhibiting a zero inclination, but can exhibit a non-zero inclination. The displacement (step 22) of the tubular structure 50 and the measurement of the accelerations (step 24) can be concomitant, provided that the tubular structure 50 remains quasi-static during displacement.

The computation of the bend has been described on the basis of two rigid collars. It is however also possible to envisage using a greater number of rigid collars distributed over a tubular structure, to refine the computation of bend of the tubular structure.

The invention is not limited to the case where the rigid objects equipped with accelerometers and fixed at distinct locations along the tubular structure are rigid collars clamped around the latter. These objects can also be embedded in the tubular structure. Thus, for example, in the case where the tubular structure is a pipe, these objects can be embedded in the wall of the pipe.

In the case of a flexible riser, the upper part is commonly equipped with a stiffener in order to limit the bend variations. In order to measure the bend of the pipe in this critical area, the rigid objects equipped with accelerometers can be either fixed around the stiffener, or embedded in the stiffener, or fixed around the pipe at the level of the stiffener, or embedded in the wall of the pipe at the level of the stiffener, with all the possible combinations. It is, for example, possible to use instrumented rigid collars clamped around the pipe itself, then clad locally over the entire length of the stiffener by a polymer sheath having an outer diameter slightly less than the inner diameter of the stiffener, such that the stiffener can be adapted around the pipe equipped with these collars and this local cladding.

The invention claimed is:

1. A method comprising determining a bend of a deformable tubular structure, wherein determining the bend of a deformable tubular structure comprises
determining inclinations of first and second rigid objects in a fixed reference frame, the fixed reference frame being fixed relative to the direction of the Earth's gravitational field, said rigid objects being fixed at distinct locations along said tubular structure,
wherein determining the inclinations of the first and second rigid objects comprises
designating the first rigid object to be an object,
performing a sequence of steps on the object,
designating the second rigid object to be the object, and
performing the sequence of steps on the object,
wherein performing a sequence of steps on an object comprises obtaining measurements from accelerometers that are rigidly linked to each other by the object,
wherein each of the accelerometers measures an acceleration in at least one measurement direction,
wherein at least two of the accelerometers have non-collinear measurement directions,
wherein the accelerometers measure the components of the Earth's gravitational field along their respective measurement directions, thereby providing, for each of said measurement directions, a measured value,
solving a matrix equation to determine the inclination $\Phi$ of the object relative to the fixed reference,
wherein the matrix equation is:

$$M = A \begin{bmatrix} \cos(\phi) \\ -\sin(\phi)\sin(\eta) \\ -\sin(\phi)\cos(\eta) \end{bmatrix}$$

wherein M is a vector having the measured values as components thereof,
wherein A is a matrix defined by the measurement directions of the accelerometers in a secured reference frame,
wherein the secured reference frame is a reference frame that is secured to the object, and
wherein $\eta$ is an angle of rotation of the secured reference frame relative to the fixed reference frame, and
after having performed the sequence of steps on both the first rigid object and on the second rigid object, determining the bend of the tubular structure from the inclinations determined for the first and second rigid objects.

2. The method of claim 1, wherein said first rigid object comprises first and second accelerometers that are positioned to reduce uncertainties in their measurements and wherein the second rigid object comprises at least two accelerometers that are positioned to reduce uncertainties in their measurements.

3. The method of claim 1, wherein solving the matrix equation comprises minimizing a criterion $L(\Phi, \eta)$ defined by the following equation:

$$L(\phi, \eta) = \left\| M - A \begin{bmatrix} \cos(\phi) \\ -\sin(\phi)\sin(\eta) \\ -\sin(\phi)\cos(\eta) \end{bmatrix} \right\|^2.$$

4. The method of claim 1, wherein the first rigid object comprises a first accelerometer, wherein the first accelerometer is disposed on a first circle, wherein a first radius extends from a center of the first circle to the first accelerometer, wherein the first accelerometer has a direction of measurement that is defined by the first radius, wherein the first rigid object comprises a second accelerometer, wherein the second accelerometer is disposed on the first circle, wherein a second radius extends from a center of the first circle to the second accelerometer, wherein the second accelerometer has a direction of measurement that is defined by the second radius, wherein the first rigid object comprises a third accelerometer, wherein the third accelerometer is disposed on the first circle, wherein a third radius extends from a center of the first circle to the third accelerometer, wherein the third accelerometer has a direction of measurement that is defined by the third radius, wherein the first rigid object comprises a fourth accelerometer, wherein the fourth accelerometer is disposed on the first circle, wherein a fourth radius extends from a center of the first circle to the fourth accelerometer, wherein the fourth accelerometer has a direction of measurement that is defined by the fourth radius, wherein the second rigid object comprises a first accelerometer, wherein the first accelerometer is disposed on a second circle, wherein a first radius extends from a center of the second circle to the first accelerometer, wherein the first accelerometer has a direction of measurement that is defined by the first radius, wherein the second rigid object comprises a second accelerometer, wherein the second accelerometer is disposed on the second circle, wherein a second radius extends from a center of the second circle to the second accelerometer, wherein the second accelerometer has a direction of measurement that is defined by the second radius, wherein the second rigid object comprises a third accelerometer, wherein the third accelerometer is disposed on the second circle, wherein a third radius extends from a center of the second circle to the third accelerometer, wherein the third accelerometer has a direction of measurement that is defined by the third radius, and wherein the second rigid object comprises a fourth accelerometer, wherein the fourth accelerometer is disposed on the second circle, wherein a fourth radius extends from a center of the second circle to the fourth accelerometer, wherein the fourth accelerometer has a direction of measurement that is defined by the fourth radius.

5. The method of claim 4, wherein the first through fourth accelerometers of the first rigid body are distributed uniformly on said first circle and wherein the first through fourth accelerometers of the second rigid body are distributed uniformly on the second circle.

6. The method of claim 4, wherein the first through fourth accelerometers of the first rigid object and the first through fourth accelerometers of the second rigid object exhibit a gaussian and centered statistical measurement noise, wherein solving the matrix equation comprises minimizing a criterion $L(\Phi, \eta)$ defined by the following equation:

$$L(\theta,\eta)=(\sin(\phi)\underline{f}(\eta)-\underline{m})^T \times \underline{\Gamma}^{-1} \times (\sin(\phi)\underline{f}(\eta)-\underline{m})$$

$$L(\theta,\eta)=(\sin(\phi)\underline{f}(\eta)-\underline{m})^T \times \underline{\Gamma}^{-1} \times (\sin(\phi)\underline{f}(\eta)-\underline{m})$$

wherein $f(\eta)$ is a vector of which the $i^{th}$ component is equal to $\sin(\alpha_i+\eta)$ and wherein $\Gamma$ is a covariance matrix corresponding to the statistical measurement noises of the accelerometers for said measurement directions.

7. The method of claim 6, wherein the statistical noises of the accelerometers are statistically independent and wherein the covariance matrix $\Gamma$ is a diagonal matrix defined positive of which the $i^{th}$ coefficient is equal to the variance $\sigma_i^2$ for the $i^{th}$ measurement direction.

8. The method of claim 1, wherein said tubular structure has a maximum inherent acceleration relative to the fixed reference frame at least ten times less than the amplitude of the gravitational field g during said measurements.

9. The method of claim 1, wherein said inclinations used for determining the bend are based on simultaneous measurements of the accelerometers of the first and second rigid objects.

10. The method of claim 1, wherein the bend of the tubular structure between the first and second objects is determined by $$k(S) = \frac{d\phi(s)}{ds}$$

wherein k(S) is the bend at the point S of a curvilinear abscissa s between the first and second objects and wherein $\phi(s)$ is the inclination of the tubular structure at the point S of curvilinear abscissa s.

11. The method of claim 1, wherein said tubular structure has a maximum inherent acceleration relative to the reference frame of reference at least twenty times less than the amplitude of the gravitational field during said measurements.

12. An apparatus comprising
a computation device,
a tubular deformable structure, and
first and second rigid objects,
wherein the first rigid object rigidly links together a first set of accelerometers and the second rigid object rigidly links together a second set of accelerometers,
wherein each of the accelerometers is able to measure a component of the Earth's gravitational field in at least one measurement direction to provide a measurement for the measurement direction,
wherein at least two accelerometers of the first set have non-collinear measurement directions and at least two accelerometers of the second set have non-collinear measurement directions,
wherein the computation device is programmed to determine an inclination $\Phi$ of each of said first and second rigid objects relative to a fixed reference frame,
wherein the fixed reference frame is fixed relative to the direction of the Earth's gravitational field by designating the first rigid object to be an object, solving a matrix equation for the object, designating the second rigid object to be the object, and solving the matrix equation for the object,
wherein the matrix equation is given by:

$$M = A \begin{bmatrix} \cos(\phi) \\ -\sin(\phi)\sin(\eta) \\ -\sin(\phi)\cos(\eta) \end{bmatrix}$$

wherein M is a vector having, as components thereof, the measurements,
wherein A is a matrix defined by the measurement directions of the accelerometers on the object in a secured reference frame, the secured reference frame being a reference frame that is secured to the object,
wherein $\eta$ is an angle of rotation of the secured reference frame relative to the fixed reference frame, and
wherein the computation device is further configured to determine the bend of the tubular structure between said first and second rigid objects from the inclinations determined for the first and second rigid objects.

13. The apparatus of claim 12, wherein said first and second rigid objects comprise non-deformable collars that are fixed to said tubular structure.

* * * * *